April 10, 1928.  1,665,373
F. H. LAMB
CONVEYER FLIGHT
Filed Aug. 30, 1926
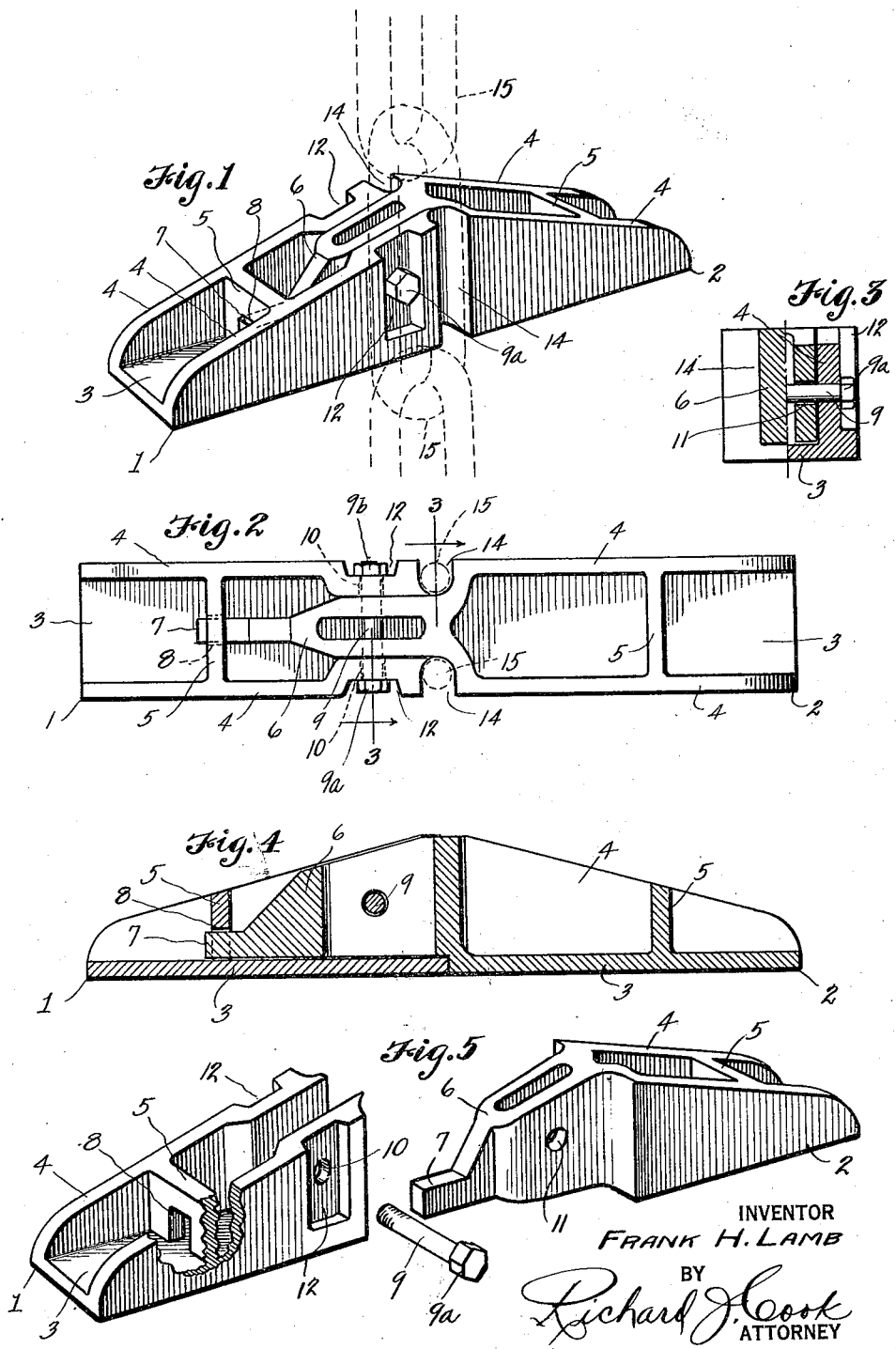
INVENTOR
FRANK H. LAMB
BY
Richard J. Cook
ATTORNEY Patented Apr. 10, 1928.

1,665,373

UNITED STATES PATENT OFFICE.

FRANK H. LAMB, OF HOQUIAM, WASHINGTON.

CONVEYER FLIGHT.

Application filed August 30, 1926. Serial No. 132,504.

This invention relates to improvements in conveyers, and more particularly to the provision of a conveyer flight, or bucket, of a character primarily intended for use in connection with conveyer chains as used in saw mills as slab conveyers, but which is readily applicable to conveyers of various character as are used in mines, elevators, dredges or for other purposes.

It is the principal object of the invention to provide a flight for use on chain conveyers which is adapted to be detachably interlocked with the link of the chain without causing the link to be opened or in any way altered.

More specifically, the object of the invention resides in the provision of a conveyer flight comprising opposite end sections, one of which has a shank projecting therefrom at one end adapted to be inserted through a link of the conveyer chain and to be interlocked within a recess in the adjacent end of the other end section to thereby secure the flight on the chain in a rigid connection with the link.

Another object is to provide a simple, yet substantial and durable, means for connecting the opposite end sections of the flight which are rendered separable by the removal of a single bolt.

Other objects of the invention reside in the various details of construction of the parts and in their method of assembly with a conveyer chain.

In accomplishing the various objects, I have provided the improved details of construction, the preferred forms of which are illustrated in the accompanying drawings, wherein—

Figure 1 is a perspective view of a conveyer flight embodied by the present invention.

Figure 2 is a top view of the same.

Figure 3 is a cross section taken on the line 3—3 in Figure 2.

Figure 4 is a longitudinal section taken centrally of the flight.

Figure 5 is a perspective view of the parts in disassembled relation.

Referring more in detail to the drawings—

1 and 2, respectively, designate the opposite end sections of a conveyer flight embodied by this invention, each of which comprises a flat base plate 3 with parallel flanges 4—4 integrally cast therewith at its edges and which are joined intermediate the ends of the sections by cross webs 5 that are perpendicular to the base portions. The flanges 4—4 are of substantial width at the inner ends of the sections and taper gradually toward the outer ends and are then rounded off so as to avoid any sharp corners that might catch on or damage the guide, or trough, in which the conveyer operates.

At its inner end, the section 2 is equipped with an integrally formed, continuing shank 6 adapted to fit snugly between the side flanges 4—4 of the section 1 and this shank, at its end, has a tongue 7 adapted to project through and fit within an opening 8 in the cross web 5 of the section 1. A locking bolt 9 is extended through alined apertures 10 in the opposite side flanges 4—4 and a registering aperture 11 in the shank to thereby securely and rigidly connect the two sections together. The side flanges 4—4 of section 1 are offset inwardly adjacent the inner portion of the shank and are recessed, as at 12, in their outer surfaces so as to permit the head $9^a$ and nut $9^b$ of the bolt 9 to be disposed within the planes of the outer surfaces of these flanges to avoid interrupting the otherwise smooth surfaces.

When the two sections are assembled, it is provided that the inner ends of the flanges 4—4 of section 1 be spaced somewhat from the adjacent end of the section 2 so as to provide outwardly opening, parallel channels 14—14 centrally at opposite sides of the flight, which are perpendicular to the base of the flight and the opposite side walls of these channels are rounded so that the rounded side portions of a chain link will seat solidly therein.

In assembling the parts on a conveyer chain made up of the ordinary type of links, as indicated at 15 in dotted lines in Figure 1, the two sections of the flight are first disconnected by removal of the bolt 9. The shank of the section 2 is then projected through a link of the chain and fitted within the section 1 as shown best in Figures 1 and 2 so that the sides of the link are seated within the channels 14—14 provided. The bolt 9 is then inserted to lock the parts together on the chain.

Flights of this character may be easily and quickly attached to a conveyer chain at any point and do not require any special link construction or any alteration of the link. The connection also attaches the flight rigidly to the link so that the base plate is held during travel in a plane that is perpendicular to the conveyer chain.

Having thus described my invention, what I claim as new therein and desire to secure by Letters-Patent, is:

1. A conveyer flight comprising opposite end sections; one having spaced side flanges and a connecting web toward its outer end provided with an opening, the other end section having a continuing shank at its inner end removably fitted between the said spaced side flanges of the first section with its end fitted in said web opening and a removable locking bolt extended through the said flanges and shank near the base of the latter.

2. A conveyer flight comprising complemental, opposite end sections, one of which comprises a base plate with spaced apart, opposite side flanges having transversely alined apertures and a transverse web joining the said side flanges toward the outer end of the section having an opening therethrough, a shank continuing from the inner end of the other section and fitted between the said side flanges of the first section and having an aperture adapted to register with the apertures in the flanges, a tongue at the outer end of the shank fitted within the opening of the transverse web and a locking bolt extending through the apertures of the side flanges and shank to rigidly join the sections.

3. A conveyer flight comprising complemental, opposite end sections, one of which comprises a base plate with spaced apart, opposite side flanges having transversely alined apertures therethrough near the inner end of the section and a transverse web joining the said side flanges near the outer end of the section having an opening therethrough, a shank continuing from the inner end of the other section and fitted between the said side flanges of the first section and having an aperture therethrough registering with the apertures in the flanges, a tongue at the outer end of the shank fitted within the opening of the transverse web and a locking bolt extending through the apertures of the side flanges and shank; the inner ends of the two sections being spaced apart to provide channels at opposite sides of the flight for containing the opposite sides of a conveyer chain link to which the flight may be applied and the side flanges of the first section having their outer surfaces recessed to seat the head and nut of the locking bolt within the outer surfaces of the flanges.

Signed at Hoquiam, Washington, this 16th day of July, 1926.

FRANK H. LAMB.